(12) United States Patent
Takase

(10) Patent No.: US 10,590,820 B2
(45) Date of Patent: Mar. 17, 2020

(54) SUPPORT FOR ELECTRIC HEATING TYPE CATALYST AND EXHAUST GAS PURIFYING APPARATUS

(71) Applicant: NGK INSULATORS, LTD., Nagoya-Shi (JP)

(72) Inventor: Naoya Takase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/299,749

(22) Filed: Mar. 12, 2019

(65) Prior Publication Data
US 2019/0292963 A1    Sep. 26, 2019

(30) Foreign Application Priority Data
Mar. 26, 2018   (JP) .................. 2018-059061

(51) Int. Cl.
*F01N 3/20*  (2006.01)
*F01N 3/28*  (2006.01)
*B01J 35/04*  (2006.01)

(52) U.S. Cl.
CPC ............ *F01N 3/2026* (2013.01); *B01J 35/04* (2013.01); *F01N 3/2828* (2013.01)

(58) Field of Classification Search
CPC ........ F01N 3/2026; F01N 3/2828; B01J 35/04
USPC ........................................... 422/174; 219/202
See application file for complete search history.

(56) References Cited

U.S. PATENT DOCUMENTS

2015/0247436 A1    9/2015  Nakayama et al.
2016/0032807 A1*   2/2016  Sugiyama .......... B01D 53/9454
                                                           422/174

FOREIGN PATENT DOCUMENTS

JP          5761161 B2      8/2015

* cited by examiner

*Primary Examiner* — Tom P Duong
(74) *Attorney, Agent, or Firm* — Burr & Brown, PLLC

(57) ABSTRACT

A support for an electric heating type catalyst includes: a honeycomb structure; and a pair of metal electrode portions. One metal electrode portion of the pair of metal electrode portions is disposed on a side opposite to the other metal electrode portion across a center of the honeycomb structure. One or both of the pair of metal electrode portions includes: a plate-shaped body portion; and a plurality of tongue pieces each protruding from the body portion. A part of each tongue piece is in contact with the honeycomb structure.

10 Claims, 12 Drawing Sheets

SUPPORT FOR ELECTRIC HEATING TYPE CATALYST AND EXHAUST GAS PURIFYING APPARATUS

TECHNICAL FIELD

The present invention relates to a support for an electric heating type catalyst. More particularly, the present invention relates to a support for an electric heating type catalyst including a honeycomb structure and a pair of metal electrode portions disposed so as to face each other across a center of the honeycomb structure, in which breakage of the honeycomb structure due to a difference of thermal expansion coefficient between the honeycomb structure and the metal electrode portions can be effectively suppressed. The present invention also relates to an exhaust gas purifying apparatus using a support for an electrically heated catalyst.

Conventionally, a member in which a catalyst is supported on a honeycomb structure made of cordierite or silicon carbide is used for treatment of harmful substances in exhaust gases discharged from motor vehicle engines (see, Patent Document 1). Such a honeycomb structure generally has a pillar shaped honeycomb structure that includes partition walls defining a plurality of cells extending from one end face to the other end face to form flow paths for an exhaust gas.

For the treatment of the exhaust gas with the catalyst supported on the honeycomb structure, a temperature of the catalyst is required for being increased to a predetermined temperature. However, as the engine is started, the catalyst temperature is lower, conventionally causing a problem that the exhaust gas is not sufficiently purified. Therefore, a system called an electric heating catalyst (EHC) has been developed. In the system, electrodes are disposed on a honeycomb structure made of conductive ceramics and the honeycomb structure itself generates heat by electric conduction, whereby the temperature of the catalyst supported on the honeycomb structure is increased to an activation temperature before or during starting of the engine.

Electrical connection to an external wiring is required for allowing a current to flow through the EHC. However, during electric heating, thermal strain is generated due to a difference in linear expansion coefficient between a metal material forming surface electrodes and wiring and a ceramic material forming a support. Therefore, there is a need for a member also having a stress buffering function so as not to add the thermal strain due to the difference in linear expansion coefficient to the support for the EHC.

As one of approaches, Patent Document 1 discloses that a wiring for supplying electric power from the outside to a pair of surface electrodes each extending in an axial direction of a support surface is formed into a comb-teeth shape, and is also fixed at a plurality of positions on the same comb-teeth by thermal spraying to provide a bent portion between the positions, thereby alleviating thermal strain (thermal stress) based on a difference in linear expansion coefficient between the wiring made of a metal and a support made of ceramics.

CITATION LIST

Patent Literature

Patent Document 1: Japanese Patent No. 5761161 B

SUMMARY OF INVENTION

However, when the plurality of points are fixed at a plurality of positions on the same comb-teeth, the expansion is different depending on each point due to heat generation distribution or the like and the stress is applied to the fixed points (contact points), so that the contact points may be broken. Further, although it is considered that bent portions are provided to relax the stress, the bent portions cannot relax torsional stress, so that the contact points may be broken.

Further, the above document also mentions a method of fixing the same electrode at only one point. However, it is believed that since the method reduces the number of contact points, the corresponding current width will become narrower.

The present invention has been made in view of the above problems. An object of the present invention is to provide a support for an electric heating type catalyst, including a honeycomb structure and a pair of metal electrode portions disposed so as to face each other across a center of the honeycomb structure, which is capable of effectively suppressing breakage of the honeycomb structure due to a difference in thermal expansion coefficient between the honeycomb structure and the metal electrode portions. Further, an object of the present invention is to provide an exhaust gas purifying apparatus using the support for the electrical heating type catalyst.

As a result of intensive studies, the present inventors have found that the above problems can be solved by providing a plurality of tongue pieces each protruding from a body portion of each of metal electrode portions and bringing the tongue pieces into contact with a honeycomb structure body, so that the honeycomb structure can be prevented from being subjected to excessive stress due to thermal strain (thermal stress) based on a difference in linear expansion coefficient between the metal electrode portions and the honeycomb structure. Thus, the present invention is specified as follows:

(1)

A support for an electric heating type catalyst, comprising:
  a honeycomb structure; and
  a pair of metal electrode portions, one metal electrode portion of the pair of metal electrode portions being disposed on a side opposite to the other metal electrode portion across a center of the honeycomb structure;
  wherein one or both of the pair of metal electrode portions comprises:
  a plate-shaped body portion; and
  a plurality of tongue pieces each protruding from the body portion, and wherein a part of each tongue piece is in contact with the honeycomb structure.

(2)

An exhaust gas purifying apparatus, comprising:
  the support for the electrical heating type catalyst according to (1), the support being disposed in an exhaust gas flow path for allowing an exhaust gas from an engine to flow; and
  a cylindrical metal member for housing the support for the electrical heating type catalyst.

According to the present invention, the support for the electric heating type catalyst including the honeycomb structure and the pair of metal electrode portions, one metal electrode portion of the pair of metal electrode portions being disposed on a side opposite to the other metal electrode portion across the center of the honeycomb structure, can effectively suppress breakage of the honeycomb structure due to the difference in thermal expansion coefficient between the honeycomb structure and the metal electrode portions.

DESCRIPTION OF THE PREFERRED EMBODIMENTS

Hereinafter, embodiments of a support for an electrically heating type catalyst according to the present invention will be described with reference to the drawings. However, the present invention is not limited to the embodiments, and various changes, modifications, and improvements may be added without departing from the scope of the present invention, based on knowledge of those skilled in the art.

(1. Honeycomb Structure)

Figure 1:
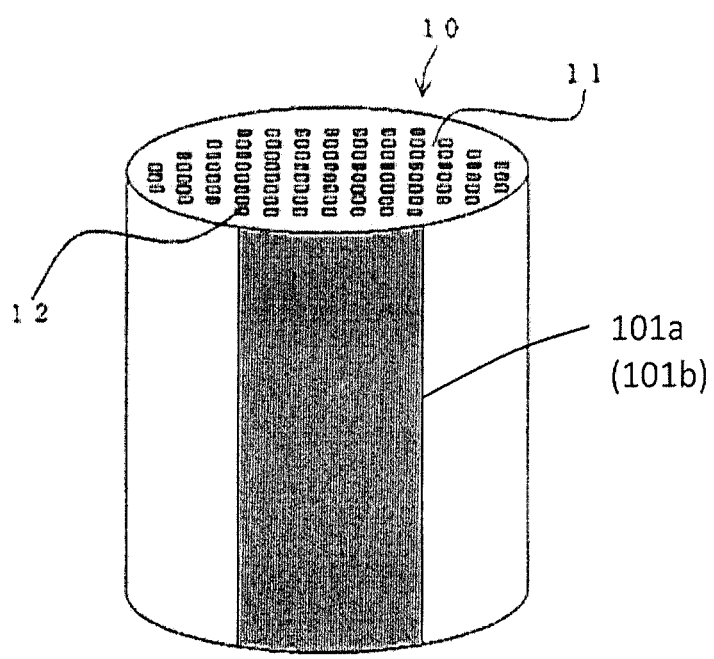
FIG. 1 is a view showing an example of a honeycomb structure in the present invention.

FIG. 1 is a view showing an example of a honeycomb structure in the present invention. For example, the honeycomb structure 10 includes: porous partition walls 11 that defines a plurality of cells 12, the cells 12 forming flow paths for a fluid, the cells extending from an inflow end face that is an end face on an inflow side of the fluid to an outflow end face that is an end face on an outflow side of the fluid; and an outer peripheral wall located at the outermost periphery. The number, arrangement, shape and the like of the cells 12, as well as the thickness of each partition wall 11, and the like, are not limited and may be optionally designed as required.

A material of the honeycomb structure 10 is not particularly limited as long as it has conductivity, and metals, ceramics and the like may be used. In particular, from the viewpoint of compatibility of heat resistance and conductivity, preferably, the material of the honeycomb structure 10 is mainly based on a silicon-silicon carbide composite material or silicon carbide, and more preferably, it is a silicon-silicon carbide composite material or silicon carbide. Tantalum silicide ($TaSi_2$) and chromium silicide ($CrSi_2$) may also be added to lower the electric resistivity of the honeycomb structure. The phrase "the honeycomb structure 10 is mainly based on a silicon-silicon carbide composite" means that the honeycomb structure 10 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure.

The electric resistivity of the honeycomb structure 10 may be set as needed depending on voltage to be applied, including, but not particularly limited to, for example from 0.001 to 200 Ω·cm, for example. For a higher voltage of 64 V or more, it may be from 2 to 200 Ω·cm, and typically from 5 to 100 Ω·cm. Further, for a lower voltage of less than 64 V, it may be from 0.001 to 2 Ω·cm, and typically from 0.001 to 1 Ω·cm, and more typically from 0.01 to 1 Ω·Cm.

Each partition wall 11 of the honeycomb structure 10 preferably has a porosity of from 35 to 60%, and more preferably from 35 to 45%. The porosity of less than 35% may result in larger deformation during firing. The porosity of more than 60% may result in decreased strength of the honeycomb structure. The porosity is a value measured by a mercury porosimeter.

Each partition wall 11 of the honeycomb structure 10 preferably has an average pore size of from 2 to 15 μm, and more preferably from 4 to 8 μm. The average pore diameter of less than 2 μm may result in excessively higher electric resistivity. The average pore diameter of more than 15 μm may result in excessively lower electric resistivity. The average pore size is a value measured by a mercury porosimeter.

The shape of each cell 12 in a cross section of each cell orthogonal to a flow path direction is not limited, but it may preferably be a square, a hexagon, an octagon, or a combination thereof. Among these, the square and hexagonal shapes are preferable. Such a cell shape leads to a decreased pressure loss when an exhaust gas flows through the honeycomb structure 10, and improved purification performance of the catalyst.

The outer shape of the honeycomb structure 10 is not particularly limited as long as it presents a pillar shape, and it may be, for example, a shape such as a pillar shape with circular bottoms (cylindrical shape), a pillar shape with oval shaped bottoms, and a pillar shape with polygonal (square, pentagonal, hexagonal, heptagonal, octagonal, and the like) bottoms, and the like. Further, for the size of the honeycomb structure 10, the honeycomb structure preferably has an area of bottom surfaces of from 2000 to 20000 $mm^2$, and more preferably from 4000 to 10000 $mm^2$, in terms of increasing heat resistance (preventing cracks generated in a circumferential direction of the outer peripheral side wall). Further, an axial length of the honeycomb structure 10 is preferably from 50 to 200 mm, and more preferably from 75 to 150 mm, in terms of increasing the heat resistance (preventing cracks generated in a direction parallel to a central axis direction on the outer peripheral side wall).

Further, the honeycomb structure 10 can be used as a catalyst support by supporting a catalyst on the honeycomb structure 10.

Production of the honeycomb structure can be carried out in accordance with a method for making a honeycomb structure in a known method for producing a honeycomb structure. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 μm, and more preferably from 3 to 40 μm. The average particle diameter of the metallic silicon particles in the metallic silicon powder is preferably from 2 to 35 μm. The average particle diameter of each of the silicon carbide particles and the metallic silicon particles refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure is the silicon-silicon carbide composite material. In the case where the material of the honeycomb structure is silicon carbide, no metallic silicon is added.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 μm. If it is less than 10 μm, pores may not be sufficiently formed. If it is more than 30 μm, a die may be clogged with the pore former during forming. The average particle size of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is dried. When the length in the central axis direction of the honeycomb structure is not the desired length, both the end faces of the honeycomb structure can be cut to the desired length.

The honeycomb dried body is then fired to prepare a honeycomb structure. Before firing, calcination may preferably be carried out in order to remove the binder and the like. The calcination is preferably performed in an air atmosphere at a temperature of from 400 to 500° C. for 0.5 to 20 hours. The methods of calcination and firing are not limited, and they may be carried out using an electric furnace, a gas furnace or the like. The firing can be preferably carried out in an inert atmosphere such as nitrogen and argon at a temperature of from 1400 to 1500° C. for 1 to 20 hours. After firing, an oxygenation treatment is preferably carried out at a temperature of from 1200 to 1350° C. for 1 to 10 hours in order to improve durability.

(2. Electrode Layer)

Figure 2:
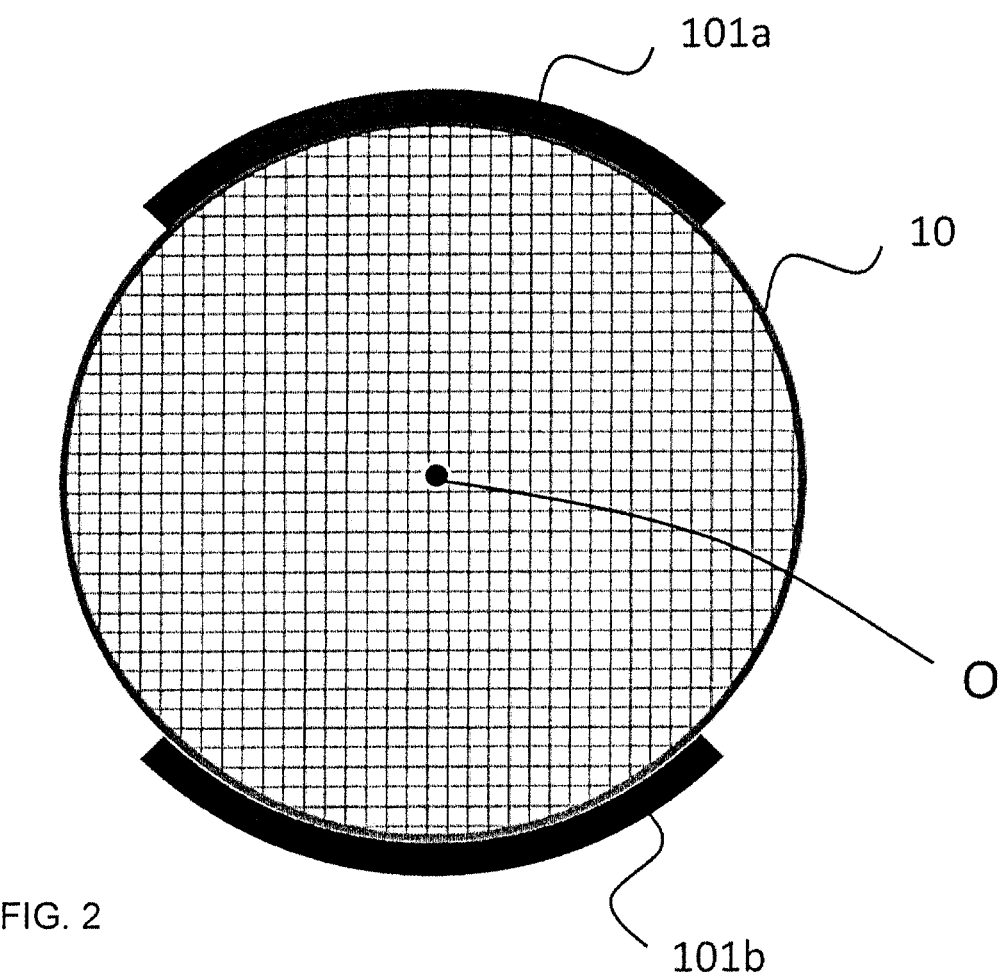
FIG. 2 is a cross-sectional view of a honeycomb structure according to an embodiment of the present invention.

As shown in FIGS. 1 and 2, the outer peripheral wall of the honeycomb structure 10 according this embodiment is provided with a pair of electrode layers 101a, 101b. Each of the electrode layers 101a, 101b is formed into a strip shape extending in the extending direction of the cell 12 of the honeycomb structure 10. In a cross section of the honeycomb structure 10 orthogonal to the extending direction of the cell 12, one electrode layer of the pair of electrode layers 101a, 101b is disposed on a side opposite to the other electrode layer across a center of the honeycomb structure 10. The pair of the electrode layers 101a, 101b is not essential for the present invention. However, such a configuration allows suppression of any bias of a current flowing in the honeycomb structure 10 and suppression of any bias of a temperature distribution in the honeycomb structure 10 when a voltage is applied, which is preferable.

The electrode layers 101a, 101b are formed of a material having conductivity. It is preferable that each of electrode layers 101a, 101b is mainly based on silicon carbide particles and silicon, and it is more preferable that each of the electrode layers 101a, 101b is formed using silicon carbide particles and silicon as raw materials except for impurities that are usually contained. As used herein, the phrase "mainly based on silicon carbide particles and silicon" means that the total mass of silicon carbide particles and silicon is 90% by mass or more of the mass of the entire electrode layer. Thus, each of the electrode layers 101a, 101b is mainly based on silicon carbide particles and silicon, whereby components of each of the electrode layers 101a, 101b and components of the honeycomb structure 10 are the same as or close to each other (which is a case where the material of the honeycomb structure is silicon carbide). Therefore, thermal expansion coefficient values of the electrode layers 101a, 101b and the honeycomb structure will be the same as or close to each other. Further, since the materials are the same as or close to each other, a bonding strength between the electrode layers 101a, 101b and the honeycomb structure 10 is also increased. Therefore, even if thermal stress is applied to the honeycomb structure, it is possible to prevent the electrode layers 101a, 101b from peeling off from the honeycomb structure 10 or joint portions between the electrode layers 101a, 101b and the honeycomb structure 10 from being broken.

Further, in the cross section orthogonal to the extending direction of the cell 12, a central angle α of each of the electrode layers 101a, 101b is preferably from 60 to 120°. Furthermore, the central angle α of one of the electrode layers 101a, 101b is preferably from 0.8 to 1.2 times the central angle α of the other of the electrode layers 101a, 101b, and more preferably 1.0 times (the same size). This can allow suppression of any bias of the current flowing through each of the outer periphery and the central region of the honeycomb structure when a voltage is applied between the pair of electrode layers 101a, 101b. In each of the outer periphery and the central region of the honeycomb structure, any bias of heat generation can be suppressed.

Figure 3:
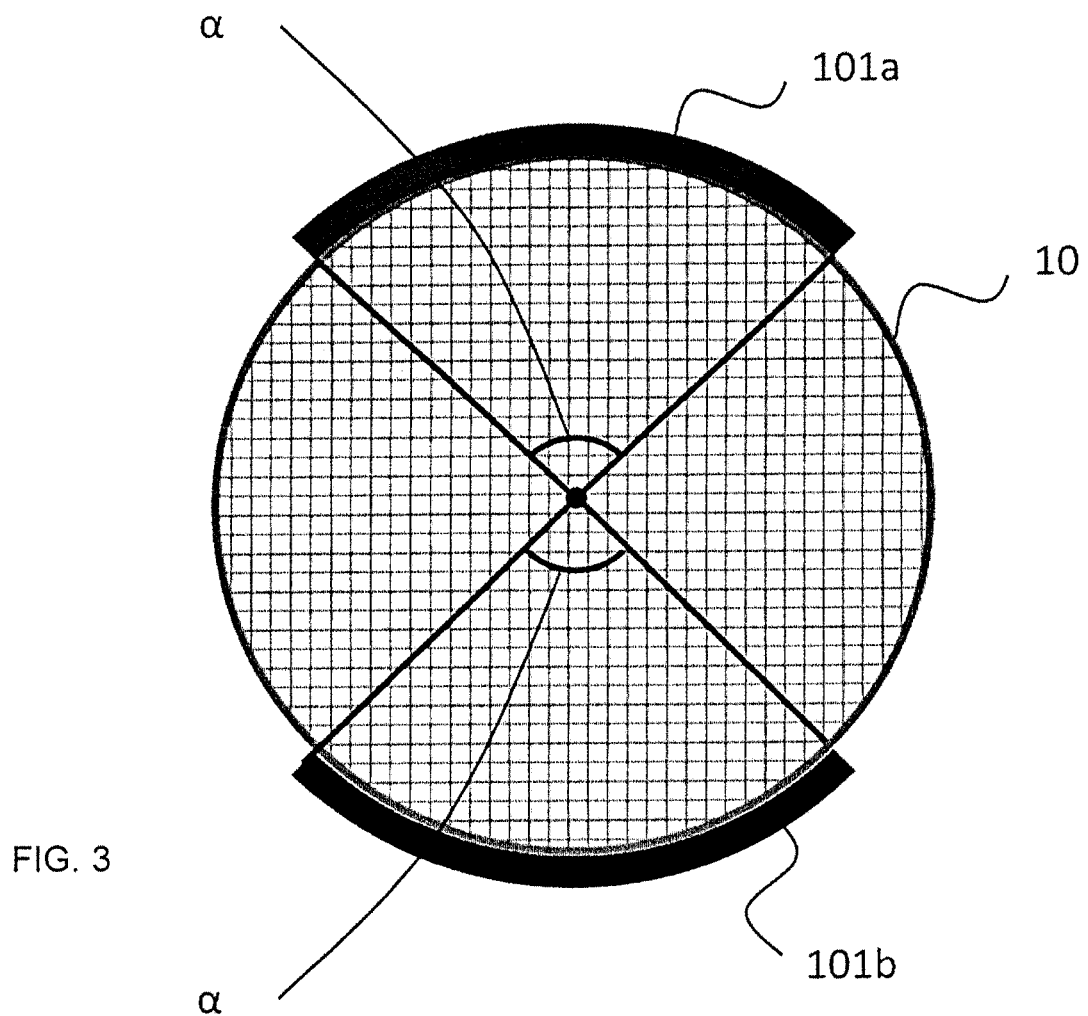
FIG. 3 is a view showing a central angle of each electrode layer in an embodiment of the present invention.

As used herein, the central angle α refers to an angle formed by straight lines connecting both end portions of the electrode layers 101a, 101b and a center of the honeycomb structure, in the cross section orthogonal to the extending direction of the cell 12 (see FIG. 3). In FIG. 3, the central angles α of the pair of electrode layers 101a, 101b are the same.

In the honeycomb structure 10 according to the present embodiment, the electric resistivity of the electrode layers 101a, 101b is preferably lower than the electric resistivity of the outer peripheral wall of the honeycomb structure 10. Further, the electric resistivity of the electrode layers 101a, 101b is more preferably from 0.1 to 10%, and particularly preferably from 0.5 to 5%, of the electric resistivity of the outer peripheral wall of the honeycomb structure 10. If it is lower than 0.1%, an amount of current flowing to the "end portions of the electrode portion" within the electrode layer 101a, 101b will be increased when a voltage is applied to the electrode layers 101a, 101b, so that the current flowing through the honeycomb structure 10 may be easily biased. In addition, it may be difficult for the honeycomb structure 10 to generate heat uniformly. If it is higher than 10%, an amount of current spreading in the electrode layers 101a, 101b is decreased when a voltage is applied to the electrode layers 101a, 101b, and the current flowing through the honeycomb structure 10 may be easily biased. In addition, it may be difficult for the honeycomb structure 10 to generate heat uniformly.

Each of the electrode layers 101a, 101b preferably has a thickness of from 0.01 to 5 mm, and more preferably from 0.01 to 3 mm. The thickness in such a range can provide contribution to uniform heat generation of the honeycomb structure. If the thickness of each of the electrode layers 101a, 101b is less than 0.01 mm, the electric resistivity will be increased and uniform heat generation may not be possible. If the thickness of each of the electrode layers 101a, 101b is more than 5 mm, breakage may occur during canning.

As shown in FIG. 1, in the honeycomb structure 10 according to the present embodiment, each of the electrode layers 101a, 101b extends in the extending direction of the cell 12 of the honeycomb structure 10 and is formed in a strip shape "extending between both end portions (both end faces)". Thus, in the honeycomb structure 10 according to the present embodiment, the pair of electrode layers 101a, 101b is disposed so as to extend between both end portions of the honeycomb structure 10. This can allow more effective suppression of the bias of the current in the axial direction of the honeycomb structure (that is, the extending direction of the cell 12) when a voltage is applied between the pair of electrode layers 101a, 101b. As used herein, the phrase "electrode layer 101a, 101b is formed (disposed) between both end portions of the honeycomb structure 10" has the following meaning: one end portion of each of the electrode layers 101a, 101b is in contact with one end portion (one end face) of the honeycomb structure 10 and the other end portion of each of the electrode layers 101a, 101b is in contact with the other end portion (the other end face) of the honeycomb structure 10.

On the other hand, a preferable embodiment is also a state where at least one end portion of each of the electrode layers 101a, 101b in "the extending direction of the cell 12 of the honeycomb structure 10" is not in contact with (does not reach) the end portion (end face) of the honeycomb structure 10. This can improve thermal shock resistance of the honeycomb structure.

In the honeycomb structure 10 of the present embodiment, each of the electrode layers 101a, 101b is formed in a shape such that a planar rectangular member is curved along an outer periphery of a pillar shape, for example as shown in FIGS. 1 and 2. Here, a shape when the curved electrode layer 101a, 101b is deformed into a non-curved planar member will be referred to as a "planar shape" of the electrode layer 101a, 101b. The "planar shape" of the electrode layer 101a, 101b shown in FIGS. 1 to 3 will be a rectangle. An "outer peripheral shape of the electrode layer" as used herein means "an outer peripheral shape of the planar shape of the electrode layer".

In the honeycomb structure 10 according to the present embodiment, the outer peripheral shape of the strip-shaped electrode layer may be a shape in which each of rectangular corner portions are formed in a curved shape. Such a shape allows improvement of the thermal shock resistance of the honeycomb structure. A preferable embodiment is that the outer periphery of the strip-shaped electrode layer has a shape in which the rectangular corner portions are linearly chamfered. Such a shape can allow improvement of the thermal shock resistance of the honeycomb structure.

In the honeycomb structure 10 according to the present embodiment, the length of the current path is preferably 1.6 times or less the diameter of the honeycomb structure, in the cross section orthogonal to the extending direction of the cell. If it is more than 1.6 times, energy may be unnecessarily consumed. As used herein, the "current path" refers to a path through which a current flows. The "length of the current path" refers to a length 0.5 times the length of the "outer periphery" through which current flows, in the "cross section orthogonal to the extending direction of the cell" of the honeycomb structure. This means the maximum length of the "flow paths through which current flows" in the "cross section orthogonal to the extending direction of the cell" of the honeycomb structure. The "length of the current path" is a value measured along surfaces within irregularities or a slit when the irregularities are formed on the outer periphery or the slit opening to the outer periphery are formed in the honeycomb structure. Therefore, for example, when the slit opening to the outer periphery is formed in the honeycomb structure, "the length of the current path" will be longer by a length approximately two times the depth of the slit.

The electric resistivity of the electrode layers 101a, 101b is preferably from 0.1 to 1.0 Ωcm, and more preferably from 0.1 to 50 Ωcm. By such a range of the electric resistivity of the electrode layers 101a, 101b, the pair of electrode layers 101a, 101b effectively act as electrodes in a pipe through which an exhaust gas at an elevated temperature flows. If the electric resistivity of the electrode layers 101a, 101b is less than 0.1 Ωcm, the temperature of the honeycomb portion near both ends of each of the electrode layers 101a, 101b will tend to rise, in the cross section orthogonal to the extending direction of the cell. If the electric resistivity of the electrode layers 101a, 101b is more than 100 Ωcm, current will hardly flow, so that it may be difficult to play a role as an electrode. The electric resistivity of each of the electrode layers 101a, 101b is a value at a temperature of 400° C.

Each of the electrode layers 101a, 101b preferably has a porosity of from 30 to 60%, and more preferably 30 to 55%. The porosity of each of the electrode layers 101a, 101b in such a range can provide a suitable electric resistivity. If the porosity of each of the electrode layers 101a, 101b is less than 30%, deformation will occur during the production. If the porosity of each of the electrode layers 101a, 101b is more than 60%, the electric resistivity may be excessively increased. The porosity is a value measured with a mercury porosimeter.

Each of the electrode layers 101a, 101b preferably has an average pore diameter of from 5 to 45 μm, and more preferably 7 to 40 μm. The average pore diameter of each of the electrode layers 101a, 101b in such a range can provide a suitable electric resistivity. If the average pore diameter of each of the electrode layers 101a, 101b is less than 5 μm, the electric resistivity may become too high. If the average pore diameter of each of the electrode layers 101a, 101b is more than 45 μm, the strength of each of the electrode layers 101a, 101b may be weakened and may tend to be broken. The average pore diameter is a value measured with a mercury porosimeter.

When each of the electrode layers 101a, 101b is mainly based on the "silicon-silicon carbide composite material", silicon carbide particles contained in each of the electrode layers 101a, 101b preferably have an average particle diameter of from 10 to 60 μm, and more preferably 20 to 60 μm. The average particle diameter of the silicon carbide particles contained in the electrode layers 101a, 101b in such a range can allow the electric resistivity of the electrode layers 101a, 101b to be controlled within a range of from 0.1 to 100 Ωcm. If the average particle diameter of the silicon carbide particles contained in the electrode layers 101a, 101b is less than 10 μm, the electric resistivity of the electrode layers 101a, 101b may become too high. If the average particle diameter of the silicon carbide particles contained in the electrode layers 101a, 101b is more than 60 μm, the strength of each of the electrode layers 101a, 101b may be weakened and may tend to be broken. The average particle diameter of the silicon carbide particles contained in the electrode layers 101a, 101b is a value measured by a laser diffraction method.

When each of the electrode layers 101a, 101b is mainly based on the "silicon-silicon carbide composite material", a ratio of a mass of silicon contained in the electrode layers 101a, 101b to "the total of the respective masses of silicon carbide particles and silicon" contained in the electrode layers 101a, 101b is preferably in a range of from 20 to 40% by mass. The ratio of the mass of silicon to "the total of the respective masses of silicon carbide particles and silicon" contained in the electrode layers 101a, 101b is more preferably from 25 to 35% by mass. By such a range of the ratio of the mass of silicon to "the total of the respective masses of silicon carbide particles and silicon" contained in the electrode layers 101a, 101b, the electric resistivity of the electrode layers 101a, 101b can be in a range of from 0.1 to 100 Ωcm. If the ratio of the mass of silicon to "the total of the respective masses of silicon carbide particles and silicon" contained in the electrode layers 101a, 101b is less than 20% by mass, the electric resistivity may become too high, and if it is more than 40% by mass, deformation may tend to occur during the production.

(3. Metal Electrode Portion)

Figure 4:
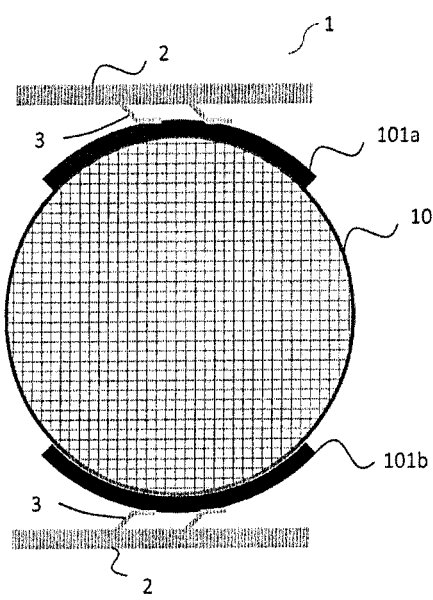
FIGS. 4A-4B are views showing arrangement of metal electrode portions in an embodiment of the present invention.
Figure 4:
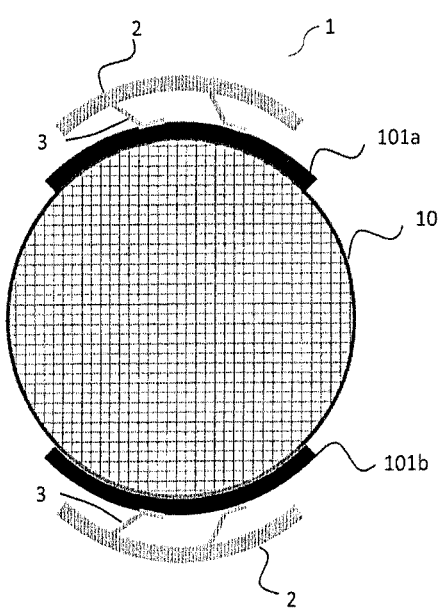

As shown in FIGS. 4A-4B, the honeycomb structure 10 is in contact with a pair of metal electrode portions 1, 1 via the electrode layers 101a, 101b. Here, each of the metal electrode portions 1, 1 is provided with a plate-shaped body portion 2 and a plurality of tongue pieces 3 (two in the figure) protruding from the body portion. A part of each tongue piece 3 is in contact with the honeycomb structure 10 (in the figure, it is in contact with the honeycomb structure 10 via any of the electrode layers 101a, 101b). According to arrangement, when a voltage is applied through the electrode layers 101a, 101b, the metal electrode portions 1, 1 can be energized to cause the honeycomb structure 10 to generate heat by Joule heat. Therefore, the honeycomb structure 10 can be suitably used as a heater. The applied voltage is preferably from 12 to 900 V, and more preferably 64 to 600 V. However, the applied voltage may be changed as needed.

Figure 5:
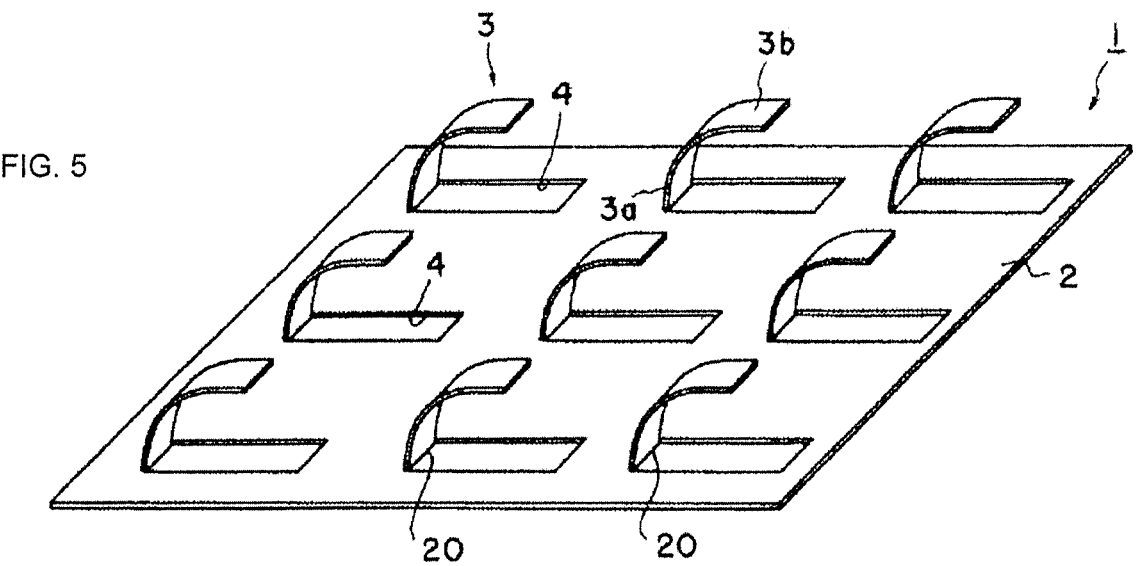
FIG. 5 is a perspective view showing a metal electrode portion 1 according to an embodiment of the present invention.

FIG. 5 is a perspective view showing a metal electrode portion 1 according to one embodiment of the present invention. The metal electrode portion 1 is provided with a body portion 2 having a flat plate shape. A plurality of tongue pieces 3 are regularly arranged upward from the body portion 2 in the figure. Each tongue piece 3 includes a rising portion 3a from the body portion 2 and a flat portion 3b protruding laterally from the rising portion 3a. Each tongue piece 3 is connected to the body portion 2 through one piece 20 at the base of the tongue piece.

In this embodiment, each tongue piece 3 is formed by cutting the body portion 2, so that a through hole 4 having substantially the same shape and size as those of the tongue piece 3 is formed. A flat portion 3b is in contact with an upper electrochemical cell.

Figure 6:
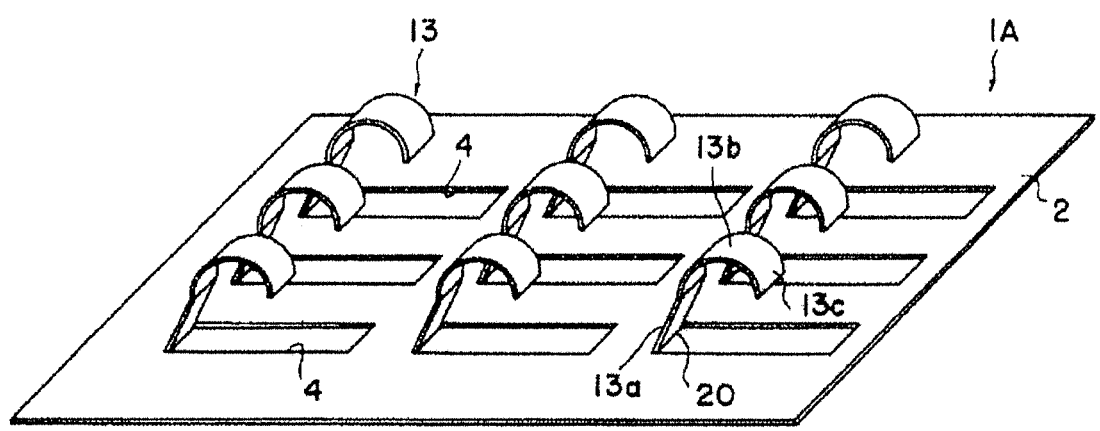
FIG. 6 is a perspective view showing a metal electrode portion 1A according to another embodiment of the present invention.

FIG. 6 is a perspective view showing a metal electrode portion 1A according to another embodiment of the present invention. The metal electrode portion 1A includes a main body portion 2 having a flat plate shape. A plurality of tongue pieces 13 are regularly arranged upward from the body portion 2 in the figure. Each tongue piece 13 includes a rising portion 13a from the body portion 2, a flat portion 13b protruding laterally from the rising portion 13a, and a falling portion 13c extending from the flat portion 13b toward a through hole 4 side. The flat portion 13b is in contact with the upper electrochemical cell. Each tongue piece 13 is connected to the body portion 2 through one piece 20 at the base of the tongue piece.

Figure 7:
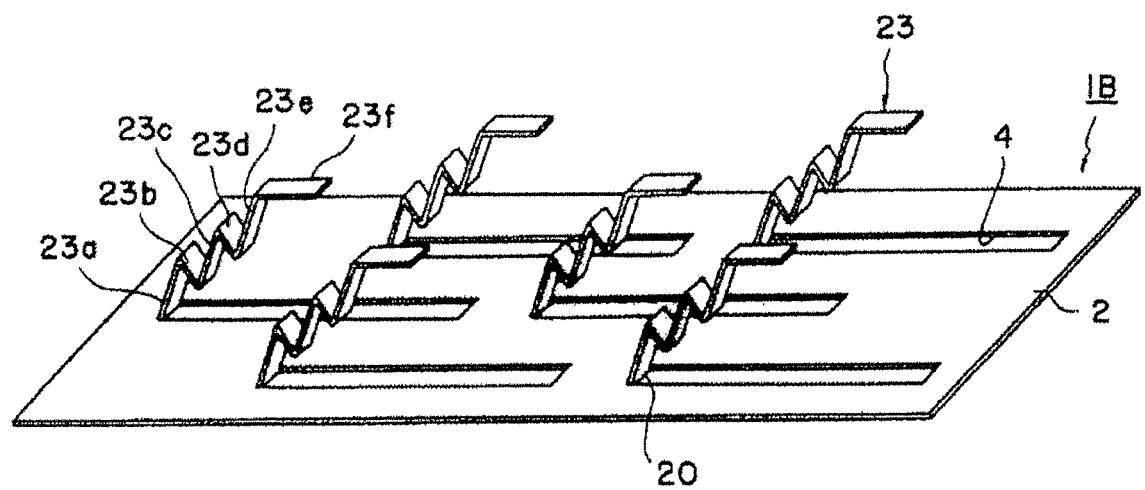
FIG. 7 is a perspective view showing a metal electrode portion 1B according to still another embodiment of the present invention.

FIG. 7 is a perspective view showing a metal electrode portion 1B according to still another embodiment of the present invention. The metal electrode portion 1B is provided with a body portion 2 having a flat plate shape. A plurality of tongue pieces 23 are regularly arranged upward from the body portion 2 in the figure. Each tongue piece 23 includes a rising portion 23a from the body portion 2, a plurality of bent portions 23b, 23c, 23d, 23e that are continuous to the rising portion 23a, and a flat portion 23f. The flat portion 23f is in contact with the upper electrochemical cell. Each tongue piece 23 is connected to the body portion 2 through one piece 20 at the base of the tongue piece.

Figure 8:
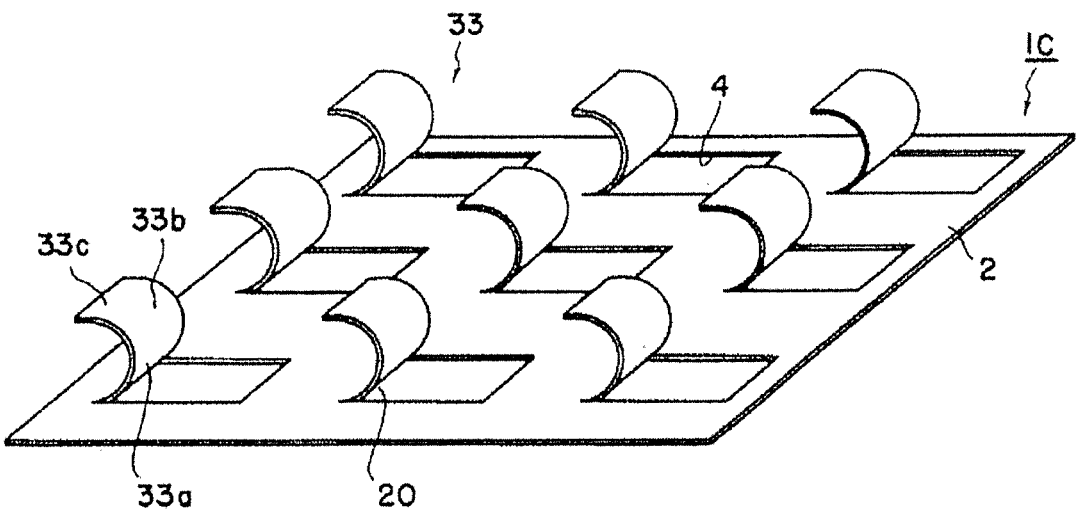
FIG. 8 is a perspective view showing a metal electrode portion 1C according to still another embodiment of the present invention.

FIG. 8 is a perspective view showing a metal electrode portion 10 according to still another embodiment of the present invention. The metal electrode portion 10 includes a body portion 2 having a flat plate shape. A plurality of tongue pieces 33 are regularly arranged upward from the body portion 2 in the figure. Each of the tongue pieces 33 includes a rising portion 33a from the body portion 2, a curved portion 33b that is continuous thereto, and a flat portion 33c that is continuous to the curved portion 33b. The flat portion 33c is in contact with the upper electrochemical cell. Each tongue piece 33 is connected to the body portion 2 through one piece 20 at the base of the tongue piece.

Further, the shape of the body portion 2 is not particularly limited as long as it is a plate shape, and may be a flat plate shape or a curved plate shape (see FIG. 4B). When the body portion 2 is in the form of a curved plate, the curved shape preferably coincides with the side surface of the honeycomb structure 10. That is, a distance between the body portion 2 and the honeycomb structure 10 is preferably constant.

Figure 9A:
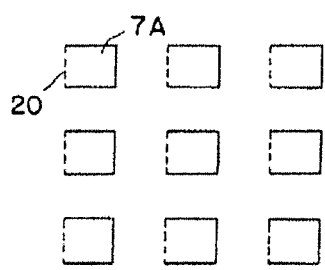
FIGS. 9A-9D show views illustrating planar forms of tongue pieces 7A, 7B, 7C and 7D, respectively.
Figure 9B:
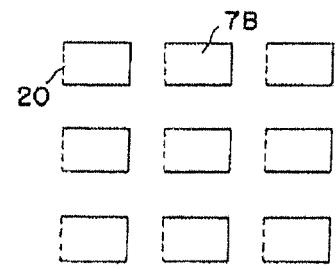
Figure 9C:
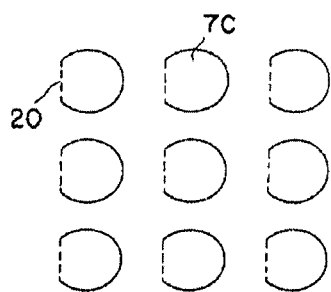
Figure 9D:
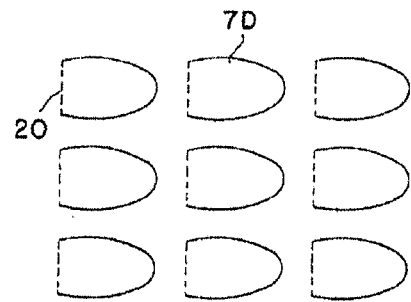

The planar shape of each tongue piece is not particularly limited. For example, as shown in FIGS. 9A-9B, tongue pieces 7A, 7B may be rectangular. Further, as shown in FIG. 9C, a tongue piece 7C may have an arc shape. As shown in FIG. 9D, a tongue piece 7D may have an oval shape.

Figure 10:
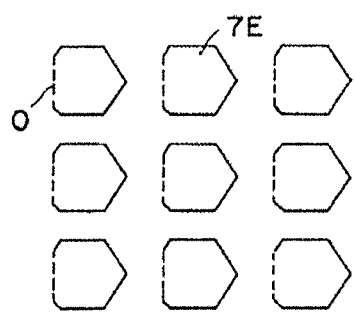
FIGS. 10A-10C are views illustrating planar forms of tongue pieces 7E, 7F and 7G, respectively.
Figure 10:
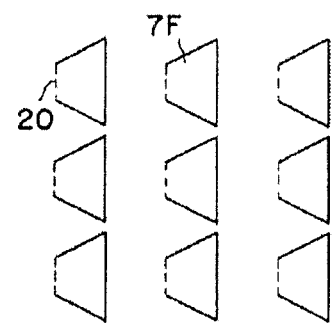
Figure 10:
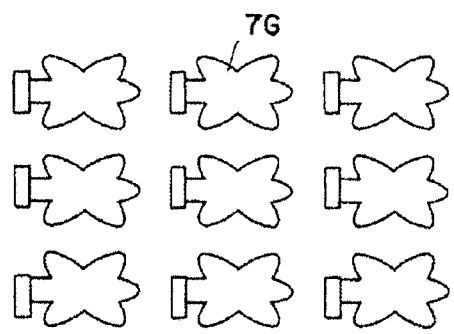

Further, as shown in FIG. 10A, a tongue piece 7E may have a polygonal shape. Further, as shown in FIG. 10B, a tongue piece 7F may have a trapezoidal shape. Further, as shown in FIG. 10C, a tongue piece 7G may have a star shape. The tongue pieces may have other various irregular shapes.

The size of each tongue piece is not particularly limited. To increase room for air permeability and deformation, each tongue piece preferably has a height of 0.3 mm or more, and more preferably 1.0 mm or more. On the other hand, if each tongue piece is too high, a utilization efficiency of a gas is lowered, so that the height of the tongue piece is preferably 5.0 mm or less. The height of the tongue piece means the longest distance of vertical distances from each part of the tongue pieces to the body portion.

A part of each tongue piece 3 is in contact with the honeycomb structure 10 (see FIGS. 4A-4B). When the electrode layer is provided on the surface of the honeycomb structure, a part of the tongue piece 3 will be in contact with the honeycomb structure 10 via the electrode layer. Thus, the metal electrode portion 1 and the honeycomb structure 10 are electrically connected. The contact of a part of each tongue piece 3 with the honeycomb structure 10 may ensure electrical connection between the metal electrode portion 1 and the honeycomb structure 10, and the contacting method is not limited. For example, the contact with the honeycomb structure 10 may be maintained using elastic deformation of the tongue piece 3, or the tongue piece 3 may be welded onto the outer peripheral wall (or the electrode layer provided on the outer peripheral wall) of the honeycomb structure 10, or a fixing layer may be formed by thermally spraying a conductive metallic material (for example, a NiCr-based material or a CoNiCr-based material) from an upper side of the tongue piece 3 and the tongue piece 3 may be welded to the outer peripheral wall of the honeycomb structure 10 (or the electrode layer provided on the outer peripheral wall). In addition, when fixing each tongue piece 3 by forming the fixing layer, the "contact" between the part of the tongue piece 3 and the honeycomb structure 10 should not be necessarily physical contact, and even if there is a space between the tongue piece 3 and the honeycomb structure 10, the metal electrode portion 1 and the honeycomb structure 10 are electrically connected by the fixing layer having conductivity, so that the part of the tongue 3 and the honeycomb structure 10 will be in contact with each other. That is, as used herein, the "contact" refers not only to physical contact but also to electrical contact.

Thus, the metal electrode portion includes the plate-shaped body portion and the plurality of tongue pieces each protruding from the body portion and a part of the tongue pieces is into contact with the honeycomb structure, whereby the plurality of tongue pieces protruding from the main portion can be independently deformed along the outer peripheral wall of the honeycomb structure, so that good electrical connection can be maintained even if shape accuracy of the honeycomb structure is poor. Further, the respective tongue pieces are separately deformed, whereby each tongue piece absorbs stress due to a difference in thermal expansion or the like. Therefore, it is possible to prevent excessive stress from being applied to the contact points and the honeycomb structure.

Furthermore, each of the plurality of tongue pieces preferably satisfies the relationship: $1 \leq A/B \leq 10$. "A" is a shortest length A from the starting point protruding from the body portion 2 of each tongue piece 3 to a most protruded point of the tongue piece 3 and "B" is a minimum value B of a width in a direction orthogonal to the direction protruding from the body portion 2 on a surface of the tongue piece 3 (FIGS. 11A-11D).

Figure 11:
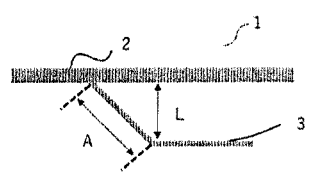
FIGS. 11A-11D are views showing a shape of a tongue piece.
Figure 11:
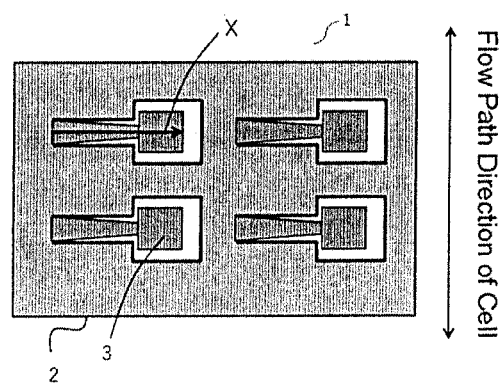
Figure 11:
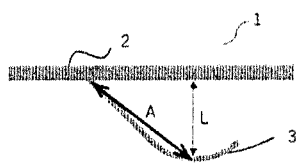
Figure 11:
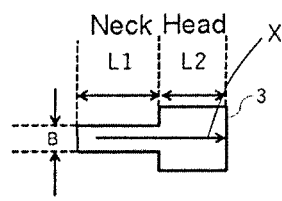

As used herein, the "most protruded position of the tongue piece" refers to a portion where a vertical distance L up to the body portion 2 is the longest (see FIGS. 11A-11B). Also, "the shortest length A to a most protruded point of the tongue piece" refers to a linear distance to a point where a distance from the starting point of protrusion of each tongue piece 3 from the body portion 2 of the tongue piece 3 is the shortest, among points where a vertical distance up to the body portion 2 is the longest (See FIGS. 11A-11B). FIG. 11A shows the A in the case of a flat plate shape in which a tip of each tongue piece 3 is parallel to the body portion 2 in the cross section of the body portion 2 in the thickness direction, and FIG. 11B shows the A in the case where the tip of each tongue piece 3 has a curved surface shape, in the cross section of the body portion 2 in the thickness direction.

The "direction of protrusion of each tongue piece 3 from the body portion 2" refers to a direction X orthogonal to the flow path direction of the cell 12 of the honeycomb structure, from the starting point protruding from the body portion 2 of the tongue piece 3 along the surface of the tongue piece 3 (see FIGS. 11C-11D). The "minimum value B of a width in a direction orthogonal to the direction protruding from the body portion 2" refers to a width in a position where a width of a tongue piece 3 in a direction perpendicular to the direction X is the minimum on the surface of the tongue piece 3 (see FIGS. 11C-11D).

FIG. 11C is a top view of the metal electrode portion 1 in FIGS. 11A-11B, FIG. 11D is a top view when the tongue 3 in FIG. 11C expands into plane. In the illustrated embodiment, the tongue 3 includes a neck; and a head having a width wider than that of the neck. The neck has a constant width, so that the width of the neck will be B.

The ratio A/B of 1 or more allows a plurality of tongue pieces protruding from the body part to be easily deformed along the outer peripheral wall of the honeycomb structure, thereby enabling torsion stress applied to the tongue piece to be relaxed. Further, the ratio A/B of 10 or less allows the strength of the tongue piece to be maintained to a certain extent and fatigue fracture of the tongue piece to be prevented, as well as a width required for flowing a large current to be ensured.

Further, it is preferable that a length L1 of the neck of each tongue piece 3 and a length L2 of the head satisfy the relationship: $1 \leq L1/L2 \leq 10$ (see FIG. 11D). The ratio L1/L2 of 1 or more allows a plurality of tongue pieces protruding from the body portion to be easily deformed along the outer peripheral wall of the honeycomb structure, and torsion stress applied to the tongue piece to be relaxed. Also, the ratio L1/L2 of 10 or less allows the strength of the tongue piece to be maintained to a certain extent, and fatigue fracture of the tongue piece to be prevented, as well as a width required for flowing a large current to be ensured.

It should be noted that the shape of each of the neck and the head is not limited, and if their appearances can be distinguished as a portion having a relatively narrow width and a portion having a relatively wide width, they can be referred to as a neck and a head, respectively.

Figure 12:
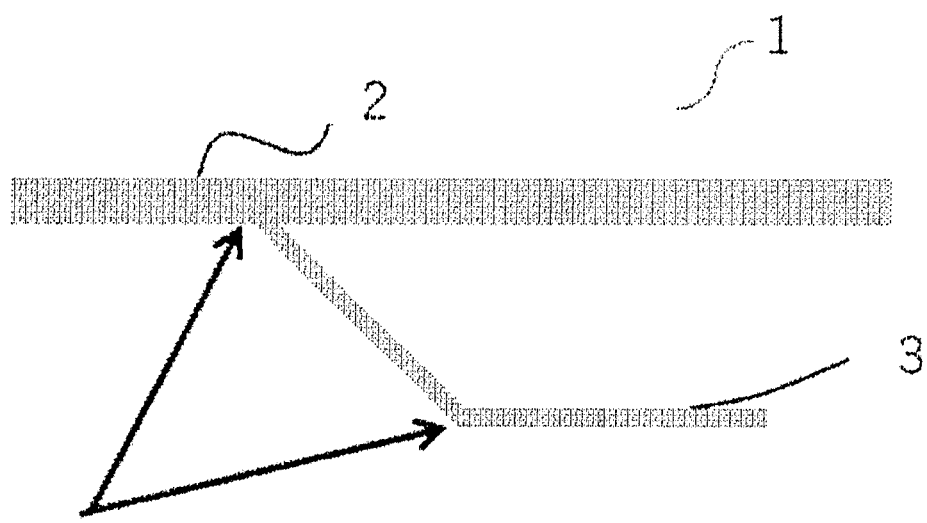
FIG. 12 is a view showing a bent portion of a tongue piece.

Further, each tongue piece 3 preferably includes two or more bent portions (see FIG. 12). The tongue piece 3 including two or more bent portions can allow improvement of a contact property with the honeycomb structure and adjustment of stress applied to the honeycomb structure by utilizing the elastic deformation of the tongue piece 3.

Examples of a metal forming the metal electrode portions 1 include, but not limited to, representatively, silver, copper, nickel, gold, palladium, silicon, and the like, in terms of ease of availability. Preferably, the metal electrode portion 1 is an iron alloy, a nickel alloy, or a cobalt alloy. It is also possible to use carbon or ceramics in place of the metal electrode portion. Non-limiting examples of ceramics include ceramics containing at least one of Si, Cr, B, Fe, Co, Ni, Ti and Ta, and illustratively, silicon carbide, chromium silicide, boron carbide, chromium boride, and tantalum silicide. Composite materials may be formed by combining the metals with the ceramics.

Further, each metal electrode portion 1 preferably has a plurality of holes (see FIG. 11C). Thus, when the honeycomb structure generates heat, a heat insulating effect of a conductive connecting member itself can be prevented, and temperatures of a front and back of the metal electrode portion 1 are constant so that the stress applied to the inside of the metal electrode portion 1 is alleviated, thereby enabling any deformation of the body portion 2 to be prevented. The plurality of holes may be through holes each formed by cutting out the tongue piece from one metal sheet. For example, they may be holes provided by using a permeable material such as a mesh material, a plate material having vent holes, and an expanded metal as the body portion.

The support for an electrical heating type catalyst according to the present invention can be used in an exhaust gas purifying apparatus. Thus, another aspect of the present invention is an exhaust gas purifying apparatus including: the support for the electrical heating type catalyst according to the present invention, the support being disposed in an exhaust gas flow path for allowing an exhaust gas from an engine to flow; and a cylindrical metal member for housing the support for the electrical heating type catalyst. As will be understood from the above descriptions, the exhaust gas purifying apparatus can achieve a required current conducting performance, so that a more stable exhaust gas purifying function can be realized.

EXAMPLES

Hereinafter, Examples is illustrated for better understanding of the present invention and its advantages, but the present invention is not limited to these Examples.
(Examples)

Silicon carbide (SiC) powder and metallic silicon (Si) powder were mixed in a mass ratio of 60:40 to prepare a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide powder (SiC) and the metallic silicon (Si) powder was 100 parts by mass. The content of the pore former was 3 parts by mass when the total of the silicon carbide powder (SiC) and the metallic silicon (Si) powder was 100 parts by mass. The content of water was 42 parts by mass when the total of the silicon carbide powder (SiC) and the metallic silicon (Si) powder was 100 parts by mass. The average particle diameter of the silicon carbide powder was 20 µm, and the average particle diameter of the metallic silicon powder was 6 µm. The average particle diameter of the pore former was 20 µm. The average particle diameter of each of the silicon carbide powder, the metallic silicon powder and the pore former refers to an arithmetic mean diameter on volume basis, when measuring frequency distribution of a particle size by the laser diffraction method.

The resulting pillar shaped green body was formed using an extruder to obtain a pillar shaped honeycomb formed body in which each cell had a square cross-sectional shape. The resulting honeycomb formed body was subjected to high-frequency dielectric heating and drying and then dried at 120° C. for 2 hours using a hot air drier, and a predetermined amount of both end faces were cut to prepare a honeycomb dried body. The honeycomb dried body was degreased (calcined) and then fired.

Then, to metallic silicon (Si) powder were added hydroxypropyl methyl cellulose as a binder, glycerin as a humectant, a surfactant as a dispersant and water, and mixed together. The mixture was kneaded to prepare an electrode layer-forming raw material. The electrode layer-forming raw material was then applied onto the side surface of the honeycomb fired body, in a strip shape so as to extend between the both end faces of the honeycomb fired body, such that a thickness was 1.5 mm. The electrode layer-forming material was applied to two positions on the side surface of the honeycomb fired body. Then, in the cross section orthogonal to the extending direction of the cell, one of the two portions coated with the electrode layer-forming material was disposed on a side opposite to the other, across the center of the honeycomb fired body.

The electrode layer-forming raw material applied to the honeycomb fired body was then dried to obtain a honeycomb fired body with unfired electrodes. The drying temperature was 70° C.

Subsequently, the honeycomb fired body with unfired electrodes was degreased (calcined), fired and further oxidized to obtain a honeycomb structure. The degreasing was carried out at 550° C. for 3 hours. The firing was performed in an Ar atmosphere at 1450° C. for 2 hours. The oxidation was carried out at 1300° C. for 1 hour. Each of the end faces of the resulting honeycomb structure had a circular shape with a diameter of 80 mm, and the length of the honeycomb structure in the extending direction of the cell was 75 mm.

Then, metal electrode portions each having a curved plate-shaped body portion (stainless steel material) matching the outer peripheral wall of the honeycomb structure; and tongue pieces (stainless steel material) each having a shape shown in FIGS. 11A-11D were respectively disposed on outer peripheral surfaces of electrode layers of the honeycomb structure, so as to face each other across a center of the honeycomb structure, and a tip of each tongue piece was fixed to each electrode layer from an upper side of the tongue piece by a welding method. Specific indices of the tongue pieces of each of Examples and Comparative Example are shown in Table 1.
(Comparative Example)

Preparation was carried out under the same conditions as those of Examples with the exception that the metal electrode portion was changed to a comb-shaped electrode which did not have any tongue piece.
(Honeycomb Breakage Test)

Each honeycomb structure in which tongue pieces (or comb-shaped electrodes) were fixed by welding was subjected to a vibration test in which the honeycomb structure was wound by a ceramic mat and then housed in a metal container, and vibration with a frequency of 100 Hz and acceleration of 30 G was applied for 24 hours. Broken states of welded portions/the honeycomb structure were visually confirmed. The number of broken samples visually confirmed is shown in Table 1.

TABLE 1

| | Tongue Piece Shape (mm) | | | Number of |
|---|---|---|---|---|
| | A (L1) | B | L2 | Breakage |
| Comparative Example | | | | 13/20 |
| Example 1 | 2 | 2 | 2 | 2/20 |
| Example 2 | 10 | 2 | 10 | 1/20 |
| Example 3 | 20 | 2 | 10 | 0/20 |
| Example 4 | 20 | 2 | 2 | 0/20 |

(Discussion)

From the results shown in Table 1, it is understood that Examples effectively suppress breakage of the welded portions/honeycomb structure as compared with Comparative Example. On the other hand, Comparative Example employing the metal electrode portions that did not have any tongue piece resulted in insufficient relaxation of the stress, and a larger number of breakage of the welded portions/honeycomb structure.

DESCRIPTION OF REFERENCE NUMERALS

10 . . . honeycomb structure
11 . . . partition wall
12 . . . cell
1, 1A, 1B, 1C . . . metal electrode portion
7A, 7B, 7C, 7D, 7E, 7F, 7G . . . tongue piece
101a, 101b . . . electrode layer
2 . . . body portion
3, 13, 23, 33 . . . tongue piece
3a, 13a, 23a, 33a . . . rising portion
3b, 13b, 23f, 33c . . . flat portion
20 . . . one piece

What is claimed is:

1. A support for an electric heating type catalyst, comprising:
    a honeycomb structure; and
    a pair of metal electrode portions, one metal electrode portion of the pair of metal electrode portions being disposed on a side opposite to the other metal electrode portion across a center of the honeycomb structure;
    wherein one or both of the pair of metal electrode portions comprises:
    a plate-shaped body portion; and a plurality of tongue pieces each protruding from the body portion, and
    wherein only a part of each tongue piece is in contact with the honeycomb structure.

2. The support for the electric heating type catalyst according to claim 1, wherein each of the plurality of tongue pieces satisfies the relationship: 1≤A/B≤10, wherein
    A is a shortest length A from a starting point protruding from the body portion of each tongue piece to a most protruded position of the tongue piece, and
    B is a minimum value B of a width in a direction orthogonal to a direction protruding from the body portion on a surface of each tongue piece.

3. The support for the electric heating type catalyst according to claim 1, wherein each of the tongue pieces comprises: a neck; and a head having a wider width than a width of the neck, and
    wherein a length L1 of the neck and a length L2 of the head satisfy the relationship: 1≤L1/L2≤10.

4. The support for the electric heating type catalyst according to claim 1, wherein each of the tongue pieces comprises two or more bent portions.

5. The support for the electric heating type catalyst according to claim 1, wherein the honeycomb structure comprises a pair of electrode layers on a side surface of the honeycomb structure, and
    wherein one electrode layer of the pair of electrode layers is disposed on a side opposite to the other electrode layer across the center of the honeycomb structure.

6. The support for the electric heating type catalyst according to claim 1, wherein each of the metal electrode portions comprises an iron alloy, a nickel alloy or a cobalt alloy.

7. The support for the electric heating catalyst according to claim 1, wherein the body portion has a plurality of holes.

8. An exhaust gas purifying apparatus, comprising:
    the support for the electrical heating type catalyst according to claim 1, the support being disposed in an exhaust gas flow path for allowing an exhaust gas from an engine to flow; and
    a cylindrical metal member for housing the support for the electrical heating type catalyst.

9. The support for an electric heating type catalyst according to claim 1, wherein the plate-shaped body portion has a main surface and the plurality of tongue pieces each protrude in a direction intersecting with the main surface of the plate-shaped body portion.

10. The support for an electric heating type catalyst according to claim 1, wherein the plurality of tongue pieces are independently in contact with the honeycomb structure through elastic deformation of the plurality of tongue pieces.

* * * * *